US012148294B2

(12) United States Patent
Shao et al.

(10) Patent No.: US 12,148,294 B2
(45) Date of Patent: Nov. 19, 2024

(54) METHODS AND SYSTEMS FOR ACCIDENT RESCUE IN A SMART CITY BASED ON THE INTERNET OF THINGS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 233 days.

(21) Appl. No.: 17/813,330

(22) Filed: Jul. 18, 2022

(65) Prior Publication Data

US 2023/0368657 A1 Nov. 16, 2023

(30) Foreign Application Priority Data

May 16, 2022 (CN) ......................... 202210528755.3

(51) Int. Cl.
*G08G 1/01* (2006.01)
*G08G 1/00* (2006.01)
(Continued)

(52) U.S. Cl.
CPC ......... *G08G 1/0116* (2013.01); *G08G 1/0145* (2013.01); *G08G 1/205* (2013.01); *G16Y 10/40* (2020.01); *G16Y 40/10* (2020.01)

(58) Field of Classification Search
CPC .... G08G 1/0116; G08G 1/0145; G08G 1/205; G08G 1/0125; G08G 1/096811;
(Continued)

(56) References Cited

U.S. PATENT DOCUMENTS

2022/0345868 A1* 10/2022 Clawson ................ G16H 40/63

OTHER PUBLICATIONS

Martinez F., Toh C., Cano J., Calafate C., Manzoni P.; "Emergency services in future intelligent transportation systems based on vehicular communication networks"; 2010; IEEE Intelligent Transportation Systems Magazine.*

(Continued)

*Primary Examiner* — Brian P Sweeney
(74) *Attorney, Agent, or Firm* — METIS IP LLC

(57) ABSTRACT

Disclosed is a method and a system for accident rescue in a smart city based on the Internet of Things. The method is implemented by a rescue management platform, including: obtaining monitoring information of a target area by a sensor network platform; judging whether an abnormal accident occurs in the target area based on the monitoring information; determining an accident type of the abnormal accident when the abnormal accident occurs in the target area; generating rescue reminder information based on the accident type, wherein the rescue reminder information includes a rescue mode of the abnormal accident; and sending the rescue reminder information to a rescuer. The system includes a rescue management platform, a sensor network platform, and an object monitoring platform. The method may be executed after the computer instructions stored in the computer-readable storage medium are read.

5 Claims, 10 Drawing Sheets

100

(51) Int. Cl.
*G16Y 10/40* (2020.01)
*G16Y 40/10* (2020.01)

(58) Field of Classification Search
CPC ........ G16Y 10/40; G16Y 40/10; G16Y 20/10; G16Y 40/50; G16Y 40/60; H04L 67/12; G06Q 10/047; G06Q 50/26; G06V 20/40; G06V 20/54; G08B 27/001
See application file for complete search history.

(56) References Cited

OTHER PUBLICATIONS

Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.

* cited by examiner

200

METHODS AND SYSTEMS FOR ACCIDENT RESCUE IN A SMART CITY BASED ON THE INTERNET OF THINGS

CROSS-REFERENCE TO RELATED APPLICATIONS

This application claims priority of Chinese Patent Application No. 202210528755.3, filed on May 16, 2022, the contents of which are hereby incorporated by reference.

TECHNICAL FIELD

The present disclosure relates to the field of the Internet of Things, in particular to a method and system for accident rescue in a smart city based on the Internet of Things.

BACKGROUND

In modern life, the sudden and unpredictable nature of accidents usually brings a great test to rescuers. Whether rescuers can arrive at the scene quickly is the key and an important influencing factor to rescue the trapped and injured persons within the best rescue time.

Therefore, a method for accident rescue in a smart city based on the Internet of Things is needed, which can make the rescuers arrive at the scene as soon as possible and improve the rescue efficiency based on monitoring information of the target area through the Internet of things.

SUMMARY

One or more embodiments of the present disclosure provide a method for accident rescue in a smart city based on the Internet of Things, the method may include: obtaining monitoring information of a target area by a sensor network platform; judging whether an abnormal accident occurs in the target area based on the monitoring information; determining an accident type of the abnormal accident when the abnormal accident occurs in the target area; generating rescue reminder information based on the accident type, wherein the rescue reminder information includes a rescue mode of the abnormal accident; and sending the rescue reminder information to a rescuer.

One or more embodiments of the present disclosure provide a system for accident rescue in a smart city based on the Internet of Things, the system includes a rescue management platform, a sensor network platform, and an object monitoring platform, wherein the rescue management platform may be configured to perform the following operations: obtaining monitoring information of a target area by the sensor network platform; judging whether an abnormal accident occurs in the target area based on the monitoring information; determining an accident type of the abnormal accident when the abnormal accident occurs in the target area; generating rescue reminder information based on the accident type, wherein the rescue reminder information includes a rescue mode of the abnormal accident; and sending the rescue reminder information to a rescuer.

One or more embodiments of the present disclosure provide a computer-readable storage medium, which may store computer instructions. When reading the computer instructions in the storage medium, the computer executes the method for accident rescue in a smart city based on the Internet of Things as described in any one of the aforementioned embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
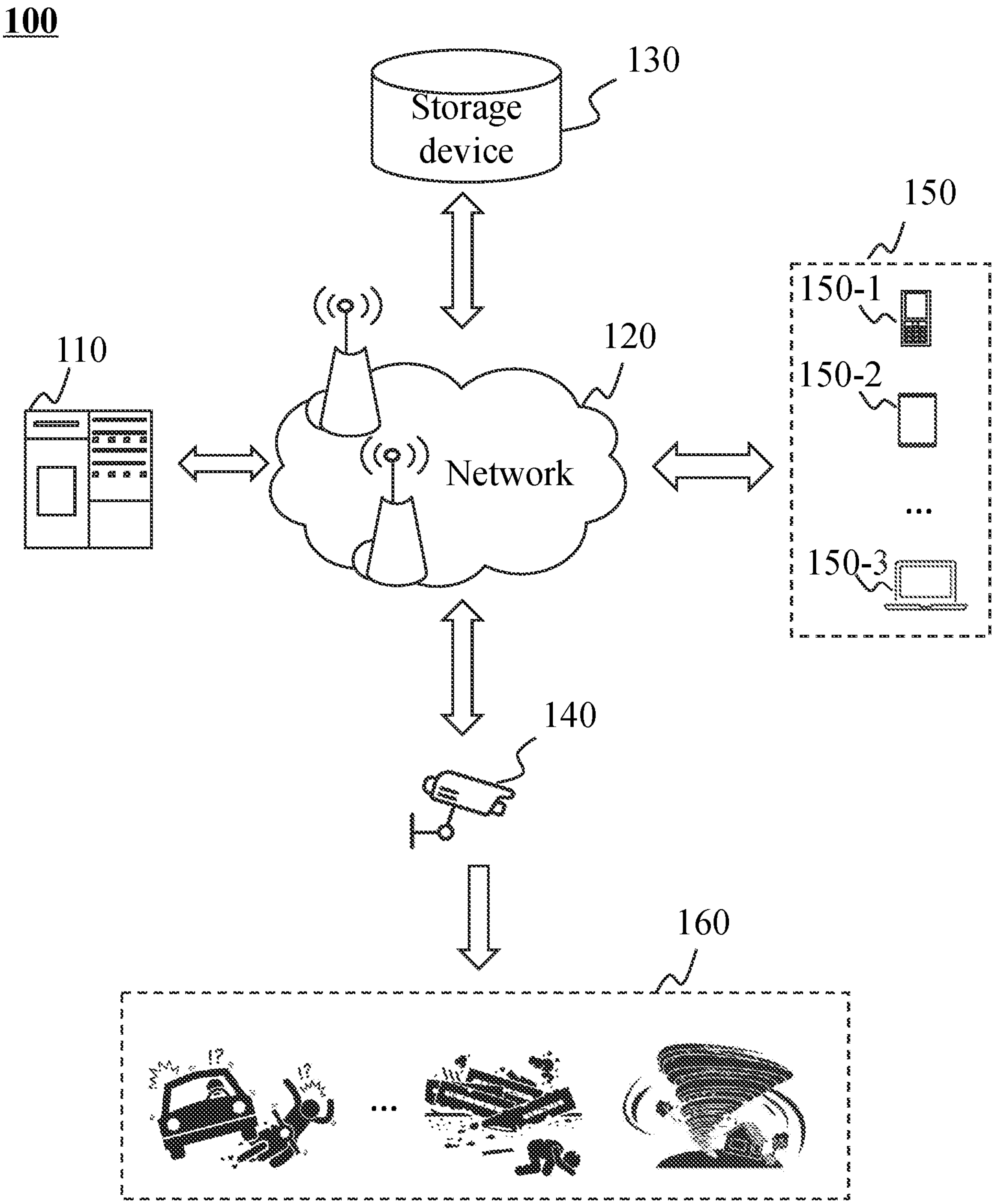
FIG. 1 is a schematic diagram illustrating an exemplary application scenario of a system for smart city accident rescue according to some embodiments of the present disclosure.

In order to more clearly explain the technical scheme of the embodiment of the present disclosure, the drawings required in the description of the embodiment are briefly introduced below. Obviously, the drawings in the following description are only some examples or embodiments of the present disclosure. For those skilled in the art, the present disclosure can also be applied to other similar situations according to these drawings without paying creative labor. Unless obviously obtained from the context or the context illustrates otherwise, the same numeral in the drawings refers to the same structure or operation.

It should be understood that the “system”, “device”, “unit” and/or “module” used herein is a method for distinguishing different components, elements, components, parts, or assemblies at different levels. However, if other words may achieve the same purpose, the words may be replaced by other expressions.

As shown in the present disclosure and claims, unless the context clearly prompts the exception, “a”, “one”, and/or “the” is not specifically singular, and the plural may be included. In general, the terms “comprises,” “comprising,” “includes,” and/or “including” only indicate that the steps and units that have been clearly identified are included. the steps and units do not constitute an exclusive list, and the method or device may also include other steps or units.

The flowcharts are used in the present disclosure to illustrate the operations performed by the system according to the embodiment of the present disclosure. It should be understood that the foregoing or following operations may not be necessarily performed exactly in order. Instead, each operation may be processed in reverse or simultaneously. Moreover, other operations may also be added into these procedures, or one or more steps may be removed from these procedures.

FIG. 1 is a schematic diagram illustrating an exemplary application scenario of a traffic management platform according to some embodiments of the present disclosure.

As shown in FIG. 1, an application scenario 100 involved in the embodiment of the present disclosure may at least include a processing device 110, a network 120, a storage device 130, a monitoring device 140, a user terminal device 150, and an abnormal accident 160.

By implementing methods and/or processes disclosed in the present disclosure, the application scenario 100 may obtain monitoring information (e.g., road monitoring video, etc.), determine whether there is an abnormal accident or type of accident (e.g., vehicle accident, fire accident, etc.), and timely notify the rescuer to go to the accident site for rescue; judge the congestion in the target area, quickly deal with the congestion and generate corresponding route planning for the rescuer, so as to help the rescuer arrive at the accident site faster, improve the rescue efficiency and avoid greater losses.

The processing device 110 may be used to process data and/or information from at least one component of the application scenario 100 or an external data source (e.g., a cloud data center). The processing device 110 may be connected to the storage device 130, the monitoring device 140, and/or the terminal device 150 via, for example, the network 120 to access and/or receive data and information. For example, the processing device 110 may acquire monitoring information from the monitoring device 140, and process the monitoring information to determine the type of abnormal accident 160. As another example, the processing device 110 may determine whether there is a mechanical fault in the storage device 130, the monitoring device 140, and/or the terminal device 150 based on the acquired data and/or information. In some embodiments, the processing device 110 may be a single processing device or a group of processing devices. In some embodiments, the processing device 110 may be locally connected to the network 120 or remotely connected to the network 120. In some embodiments, the processing device 110 may be implemented on a cloud platform. The processing device 110 may be set in places including but not limited to the control center and accident rescue management center of the urban Internet of things. In some embodiments, a cooperation platform for commanding and coordinating staff to implement various work contents (such as a rescue plan, etc.) is installed in the processing device 110. The staff may include rescue implementers, rescue command experts, comprehensive rescue management personnel, and other personnel involved in accident rescue.

The network 120 may include any suitable network providing information and/or data exchange capable of facilitating the application scenario 100. In some embodiments, information and/or data may be exchanged between one or more components (e.g., the processing device 110, the storage device 130, the monitoring device 140, and the terminal device 150) of the application scenario 100 through the network 120.

The network 120 may include a local area network (LAN), a wide area network (WAN), a wired network, a wireless network, or any combination thereof. In some embodiments, the network 120 may be any one or more of a wired network or a wireless network. In some embodiments, the network 120 may include one or more network access points. For example, the network 120 may include wired or wireless network access points, such as base stations and/or network switching points. Through these network access points, one or more components of the application scenario 100 may connect to the network 120 to exchange data and/or information.

The storage device 130 may be used to store data, instructions, and/or any other information. In some embodiments, the storage device 130 may be part of the processing device 110. In some embodiments, the storage device 130 may communicate with at least one component (e.g., the processing device 110, the monitoring device 140, the terminal device 150) of the application scenario 100. In some embodiments, the storage device 130 may store data and/or instructions used by the processing device 110 to execute or use to complete the exemplary methods described in the present disclosure. For example, the storage device 130 may store historical monitoring information. As another example, the storage device 130 may store one or more machine learning models. In some embodiments, the storage device 130 may also include a mass memory, a removable memory, etc., or any combination thereof.

The monitoring device 140 refers to a device that monitors a target area, and the monitoring device 140 may obtain the monitoring information related to the target area. For example, the monitoring device 140 may be a camera for obtaining a monitoring video monitored by the target area. In some embodiments, the monitoring device 140 may obtain monitoring information including, but not limited to, traffic flow of a road and traffic volume of a road. In some embodiments, the monitoring device 140 may monitor an accident area such as a road, a construction site, a residential area, a shopping mall, an office place, or the like. In some embodiments, the monitoring device 140 may send the collected data information related to monitoring to other components (e.g., the processing device 110) of the application scenario 100 or other components other than the application scenario 100 through the network 120. In some embodiments, the monitoring device 140 may include one or more data detection units to respectively detect other parameters in a target area (e.g., contents of harmful gas, amplitudes of building shaking, etc.). For example, the monitoring device 140 may include an inspection unit for gas (such as a detector for combustible gases, a detector for harmful gases, etc.), an inspection unit for vibration (such as a vibration sensor, etc.), and other data detection units, or the like.

The terminal device 150 may refer to one or more terminal devices or software used by a user. In some embodiments, a user (for example, a rescue implementer, a rescue command expert, etc.) may be an owner of the terminal device 150. In some embodiments, the terminal device 150 may include a mobile device 150-1, a tablet 150-2, a laptop 150-3, or any combination thereof. In some embodiments, the mobile device 150-1 may be a device having a positioning function. For example, the mobile device 150-1 may be a power of the traffic police. In some embodiments, users may interact with other components in the application scenario 100 through terminal equipment 150. For example, users may receive the first detection data detected by the terminal device 150. In some embodiments, users may control other components of the application scenario 100 through the terminal device 150. For example, users may control the monitoring device 140 through the terminal device 150 to detect the relevant parameters. In some embodiments, the user may acquire the status of the monitoring device 140 through the terminal device 150. In some embodiments, the terminal device 150 may receive the user request and transmit information related to the request to the processing device 110 via network 120. For example, the terminal device 150 may acquire a request to send monitoring information or an abnormal accident, and transmit information related to the request to the processing device 110 via network 120. Terminal device 150 may also receive information from the processing device 110 through the network 120. For example, the terminal device 150 may receive monitoring information acquired from the monitoring device 140 via network 120. One or more monitoring information acquired may be displayed on the terminal device 150. As another example, the processing device 110 may send the rescue reminder information, route planning information, or the like generated based on the monitoring information to the terminal device 150 via the network 120.

The abnormal accident 160 refers to an event that affects the normal operation of production activities or transportation activities in a target area. In some embodiments, the abnormal accident 160 may include a vehicle accident, a construction accident, a road accident, a natural disaster accident, a fire accident, or the like.

The Internet of things system is an information processing system including some or all of a rescue management platform, a sensor network platform, and an object monitoring platform. The rescue management platform may coordinate the connection and cooperation among various functional platforms (such as a sensor network platform and an object monitoring platform). The rescue management platform gathers information about the operation system of the Internet of things and may provide functions of perception management and control management for the operation system of the Internet of things. The sensor network platform may connect the rescue management platform and the object monitoring platform, and plays the function of perceptual information sensing communication and controlling information sensing communication. The object monitoring platform is a functional platform for the generation of perceptual information and the execution of control information.

The information processing in the Internet of things system may be divided into the processing flow of perceptual information and the processing flow of control information. The control information may be the information generated based on perceptual information. The processing of perceptual information is to obtain the perceptual information from the object monitoring platform and transmit it to the rescue management platform through the sensor network platform. The control information is sent from the rescue management platform to the object monitoring platform through the sensor network platform, so as to realize the control of a corresponding object.

In some embodiments, when the Internet of things system is applied to urban management, it may be called an Internet of things system in a smart city.

Figure 2:
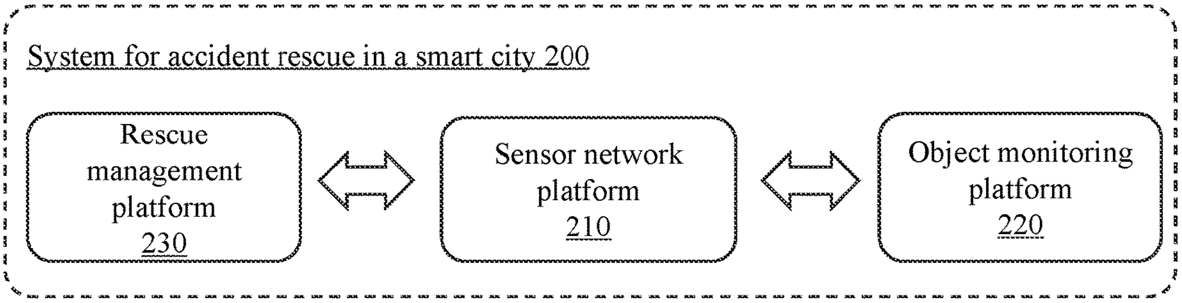
FIG. 2 is a schematic diagram illustrating an exemplary system for accident rescue in a smart city according to some embodiments of the present disclosure.

FIG. 2 is a schematic diagram illustrating an exemplary system for accident rescue in a smart city according to some embodiments of the present disclosure; as shown in FIG. 2, a system for accident rescue in a smart city 200 (or referred to as the system 200 in brief) may be implemented based on the Internet of things system. The system 200 may include a sensor network platform 210, an object monitoring platform 220, and a rescue management platform 230. In some embodiments, the system 200 may be part of or implemented by the processing device 110.

In some embodiments, the system 200 may be applied to various scenarios of accident rescue management. In some embodiments, the system 200 may respectively obtain rescue-related data (e.g., monitoring information) under various scenarios to obtain accident rescue management strategies under various scenarios. In some embodiments, the system 200 may obtain an accident rescue management strategy for the whole area (such as the whole city) based on the rescue-related data under each scenario.

Various scenarios of accident rescue management may include roads, construction sites, communities, shopping malls, office places, or the like. For example, it may include management of monitoring devices, management of rescue transportation, management of rescue prediction, or the like. It should be noted that the above scenarios are only examples and do not limit the specific application scenarios of the system 200. Those skilled in the art may apply the system 200 to any other suitable scenarios on the basis of the contents disclosed in the present disclosure.

In some embodiments, the system 200 may be applied to the management of monitoring devices. When applied to the management of monitoring devices, the system 200 may be used to collect data related to the monitoring device, such as monitoring information, for example, monitoring video, monitoring area, monitoring time, or the like; the object monitoring platform 220 may upload the collected monitoring-related data to the sensor network platform 210. The sensor network platform 210 may summarize and process the collected data. For example, the sensor network platform 210 may divide the collected data by time, accident type, accident area, or the like. The sensor network platform 210 then may upload the data that has been further summarized and processed to the rescue management platform 230. The rescue management platform 230 may make strategies or instructions related to the monitoring device based on the processing of the collected data, such as instructions for continuous monitoring, or the like.

In some embodiments, the system 200 may be applied to the management of the rescuer. When applied to the management of the rescuer, the object monitoring platform 220 may be used to collect data related to a rescuer, such as the location of the rescuer; the object monitoring platform 220 may upload the collected rescue-related data to the sensor network platform 210. The sensor network platform 210 may summarize and process the collected data. For example, the sensor network platform 210 may divide the collected data by rescue area, location of rescuer, or the like. The sensor network platform 210 then may upload the data that has been further summarized and processed to the rescue management platform 230. The rescue management platform 230 may make strategies or instructions related to the management of the rescuer based on the processing of the collected data, such as the determination of the rescuer, and the determination of the route from the rescuer to the rescue site, or the like.

In some embodiments, the system 200 may be applied to the management of rescue prediction. When applied to management of rescue prediction, the object monitoring platform 220 may be used to collect rescue-related data, such as monitoring information of preset road network areas; the object monitoring platform 220 may upload the collected data related to rescue prediction to the sensor network platform 210. The sensor network platform 210 may summarize and process the collected data. For example, the sensor network platform 210 may classify the collected data according to a location of a rescue site, a type of accident (also referred to as accident type), or the like. The sensor network platform 210 may then upload the data that has been further summarized and processed to the rescue management platform 230. The rescue management platform 230 may make prediction information related to the management of rescue prediction based on the processing of the collected data, such as degree of road congestion of each road in a preset road network area in a target time period, degree of area congestion of a preset road network area in a target time period, or the like.

In some embodiments, the system 200 may be composed of a plurality of subsystems for smart city accident rescue management, and each subsystem may be applied to one scenario. The system 200 may comprehensively manage and process the data obtained and output by each subsystem, and then obtain relevant strategies or instructions to assist the smart city accident rescue management.

For example, the system for accident rescue in a smart city may include a subsystem respectively applied to the management of monitoring devices, a subsystem applied to the management of the rescuer, and a subsystem applied to the management of rescue prediction. The system 200 is the superior system of each subsystem.

The following will take the system 200 to manage each subsystem, and obtain the corresponding data based on the subsystem to obtain the strategy for smart city accident rescue management as an example:

The system 200 may obtain the monitoring information of a target area based on a subsystem managed by a monitoring device, obtain the rescuer and rescue mode based on a subsystem managed by the rescuer, and determine whether it is necessary to start traffic emergency treatment based on a subsystem for management of rescue prediction.

During the aforementioned data acquisition, the system 200 may separately set up multiple object monitoring platforms corresponding to each subsystem for data acquisition.

After obtaining the aforementioned data, the system 200 may summarize and process the collected data through the sensor network platform 210. The sensor network platform 210 then may upload the data that has been further summarized and processed to the rescue management platform 230. The rescue management platform 230 may make prediction data related to urban accident rescue management based on the processing of the collected data.

For example, the sensor network platform 210 may obtain the monitoring information of a target area photographed by a monitoring device from the object monitoring platform 220. The sensor network platform 210 may upload the aforementioned monitoring information to the rescue management platform 230, and the rescue management platform 230 may determine whether there is an abnormal accident in the target area based on the aforementioned monitoring information.

For another example, when an abnormal accident occurs in a target area, the sensor network platform 210 may also obtain the road monitoring information of each road in the preset road network area corresponding to the target area photographed by the monitoring device from the object monitoring platform 220 within the preset time period. The sensor network platform 210 may upload the road monitoring information to the rescue management platform 230. The rescue management platform 230 may determine whether to start traffic emergency treatment based on the aforementioned road monitoring information.

As another example, the sensor network platform 210 may obtain the first location information of the rescuer and the second location information of the target area, and upload the aforementioned information to the rescue management platform 230, may determine the route planning information based on the aforementioned information and may navigate the rescuer.

For those skilled in the art, after understanding the principle of the system, it is possible to transfer the system to any other suitable scenario without departing from this principle.

The system 200 will be described in detail below by taking the application of the system 200 to a rescue prediction management scenario as an example.

The rescue management platform 230 refers to a platform for managing rescue in a city. The rescue management platform 230 may be configured to obtain monitoring information of the target area through the sensor network platform. The monitoring information of the target area is summarized and determined by the sensor network platform and an acquisition terminal through network communication. The rescue management platform 230 may judge whether an abnormal accident occurs in the target area based on the monitoring information; determine an accident type of at least one abnormal accident when the abnormal accident occurs in the target area; generate rescue reminder information based on the accident type, wherein the rescue reminder information includes a rescue mode of the abnormal accident; and send the rescue reminder information to a rescuer. In some embodiments, the rescue management platform 230 may be configured to access the object monitoring platform through the sensor network platform and obtain the monitoring information photographed by a monitoring device located in a target area on the object monitoring platform.

In some embodiments, the rescue management platform 230 may also be configured to obtain road monitoring information of each road in a preset road network area corresponding to the target area within a preset time period; determine a degree of road congestion of the each road caused by the abnormal accident in target time period based on the road monitoring information; determine a degree of area congestion of the preset road network area caused by the abnormal accident in the target time period based on the degree of road congestion; and start traffic emergency treatment when the degree of area congestion is greater than preset degree threshold.

In some embodiments, the rescue management platform 230 may also be further configured to determine a count of vehicles and traffic flow of the each road in the preset road network area within the preset time period based on the road monitoring information; determine the degree of road congestion of the each road caused by the abnormal accident in the target time period through a prediction model based on the count of vehicles and the traffic flow of the each road in the preset road network area within the preset time period, the prediction model may be a machine learning model.

In some embodiments, the rescue management platform 230 may also be further configured to process the road monitoring information based on a first determination model, determine the count of vehicles on the each road in the preset road network area within the preset time period, the first determination model may be a machine learning model.

In some embodiments, the rescue management platform 230 may also be further configured to process the road monitoring information based on a second determination model, determine the traffic flow of the each road in the preset road network area within the preset time period, the second determination model may be a machine learning model.

In some embodiments, the rescue management platform 230 may also be configured to obtain the first location information of the rescuer and the second location information of the target area; generate route planning information for the rescuer to reach the target area based on the first location information, the second location information and the degree of road congestion; send the route planning information to the rescuer; and navigate the rescuer based on the route planning information.

In some embodiments, the emergency treatment may include determining which places or sections in the road network area need to bypass and generate information of the degree of road congestion; update the information of the degree of road congestion to a traffic information display terminal set on a road and a user's vehicle navigation system to remind the user the degree of road congestion.

Figure 3:
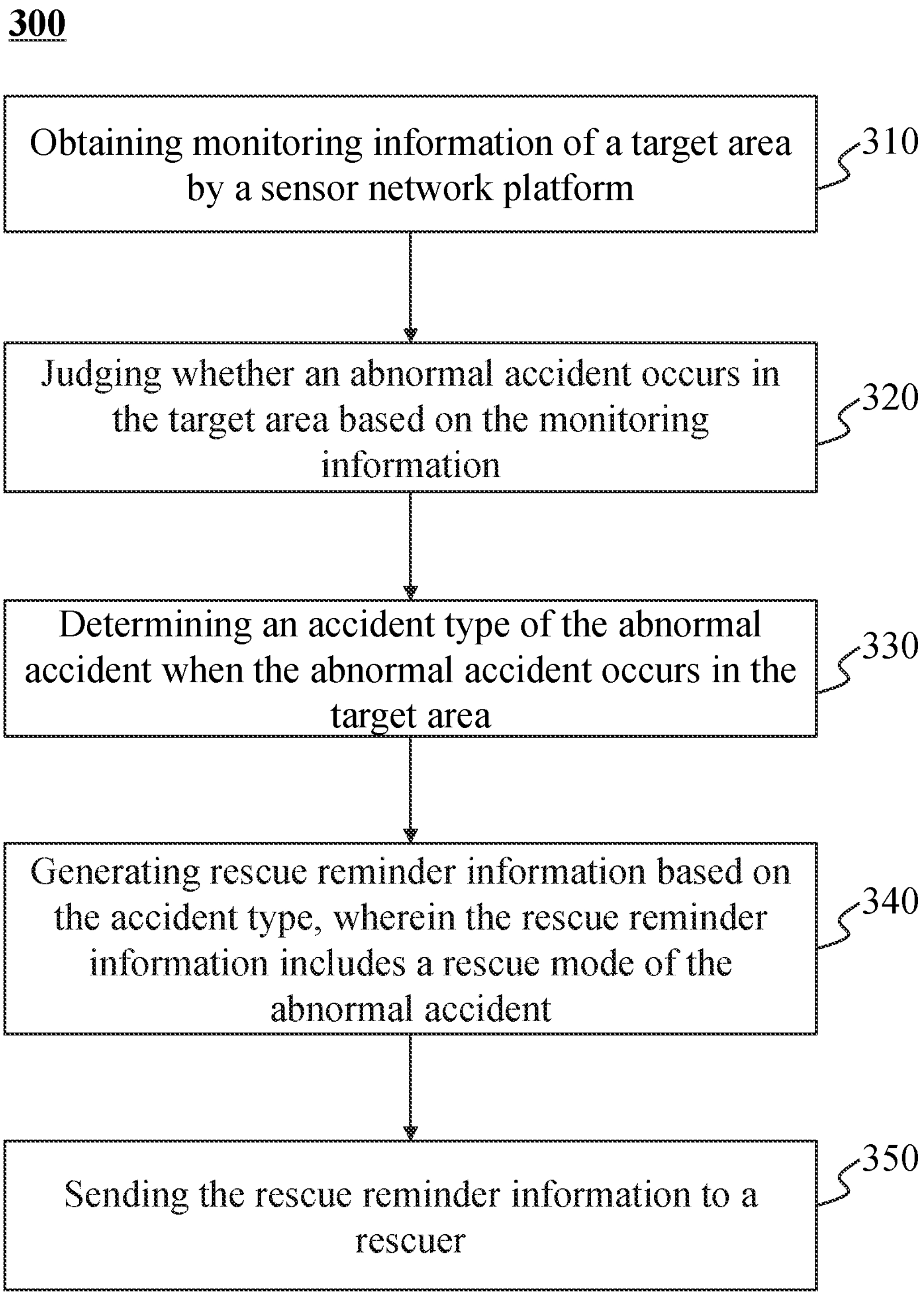
FIG. 3 is an exemplary flowchart illustrating an exemplary method for accident rescue according to some embodiments of the present disclosure.
Figure 4:
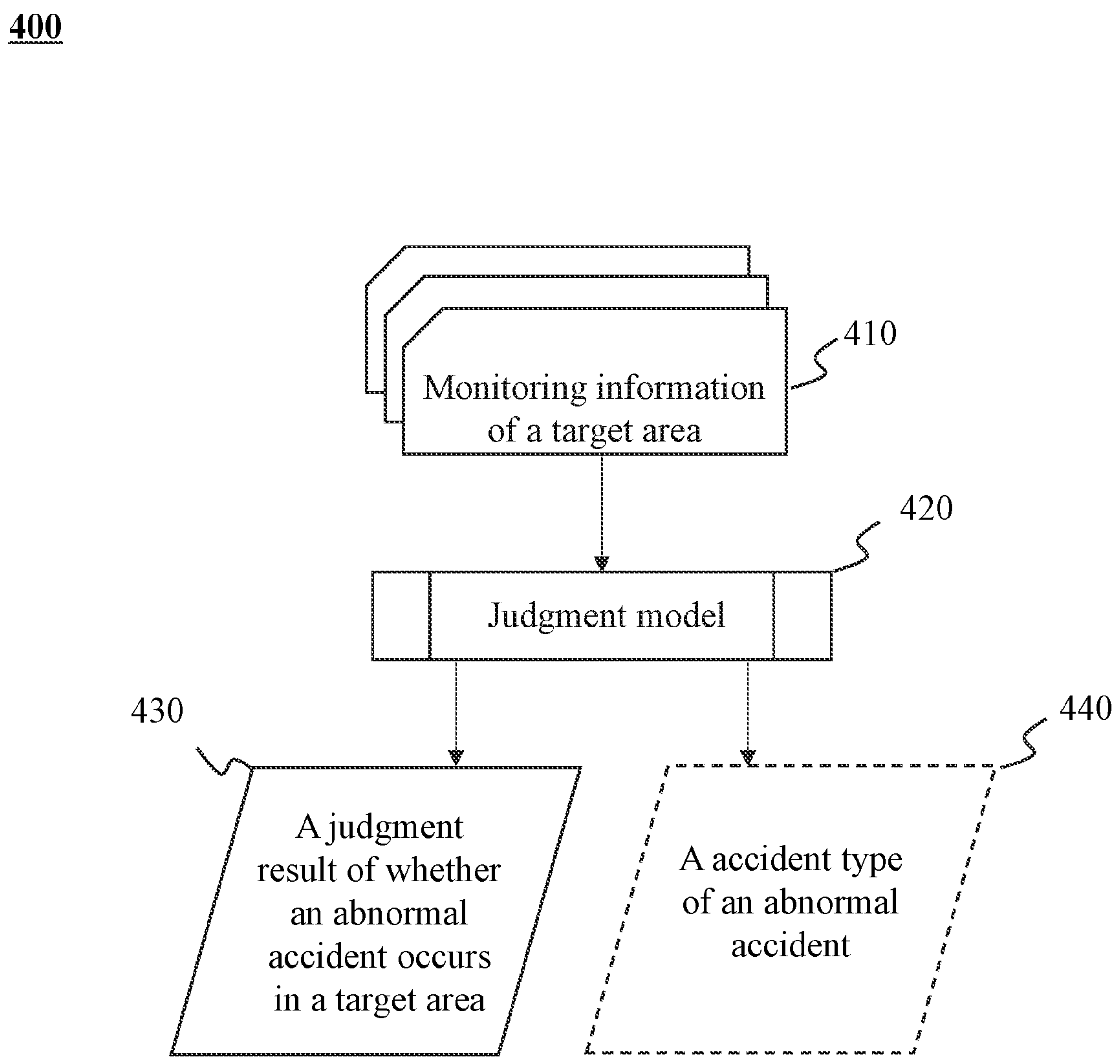
FIG. 4 is a schematic diagram illustrating an exemplary judgment result of judging whether an abnormal accident occurs in the target area and an accident type of the abnormal accident according to some embodiments of the present disclosure.
Figure 5:
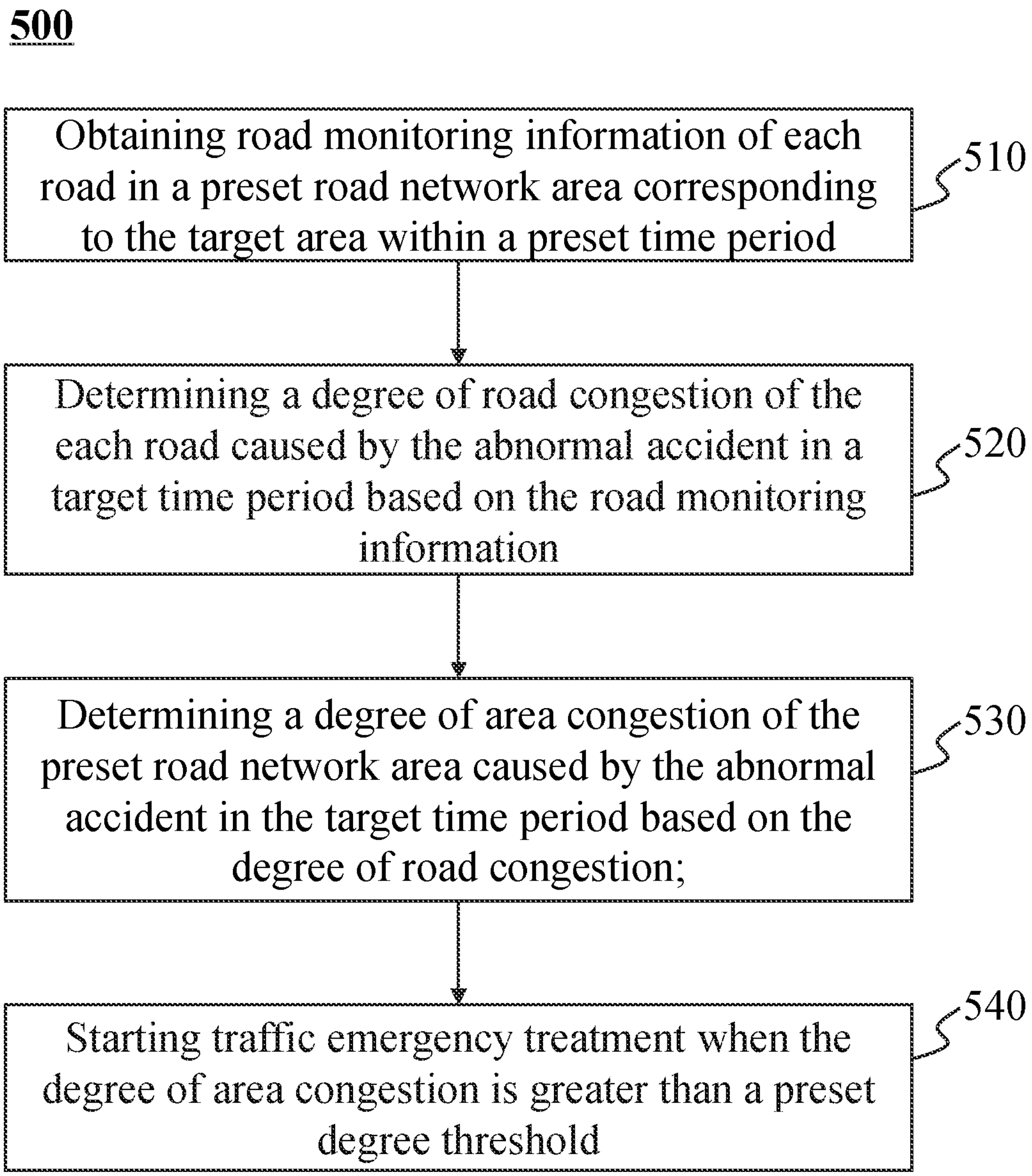
FIG. 5 is an exemplary flowchart illustrating an exemplary process for determining a degree of area congestion according to some embodiments of the present disclosure.

More details about the rescue management platform 230 may be seen in FIGS. 3-5 and its description.

The sensor network platform 210 refers to a platform for unified management of sensor communication, which may also be referred to as a sensor network rescue management platform or a sensor network management processing device. In some embodiments, the sensor network platform may connect the rescue management platform and the object monitoring platform to realize the functions of perceptual information sensing communication and controlling information sensing communication.

The rescue management platform 230 refers to a platform that manages and/or controls the Internet of thing, for example, coordinate the connection and cooperation among various functional platforms. The rescue management platform may gather all the information about the Internet of things and may provide control and management functions for the normal operation of the Internet of things.

The object monitoring platform 220 refers to a functional platform in which the perceptual information is generated and the control information is finally executed. It is the ultimate platform for the realization of users' will in some embodiments, the object monitoring platform 220 may obtain information. The obtained information may be input as the information of the whole Internet of things. Perceptual information refers to the information obtained by physical entities, for example, the information obtained by a sensor. The control information refers to the control information (for example, control instructions) formed after processing the perceptual information, such as performing identification, verification, analysis, and conversion.

In some embodiments, the sensor network platform 210 may communicate with the rescue management platform to provide relevant information and/or data for the rescue management platform, for example, first power generation data.

The object monitoring platform 220 may communicate with the sensor network platform 210, and the object monitoring platform 220 may be configured to collect and obtain data.

It should be noted that the aforementioned description of the system and its components is only for the convenience of description and cannot limit the present disclosure to the scope of the embodiments. It can be understood that for those skilled in the art, after understanding the principle of the system, they may arbitrarily combine various components or form a subsystem to connect with other components without departing from this principle. For example, the sensor network platform and the rescue management platform may be integrated into one component. For another example, each component may share a storage device, and each component may also have its own storage device. Such deformation is within the protection scope of the present disclosure.

FIG. 3 is an exemplary flowchart illustrating an exemplary method for accident rescue according to some embodiments of the present disclosure. In some embodiments, process 300 may be performed by the rescue management platform 230. As shown in FIG. 3, the process 300 may include the following processes:

In 310, the rescue management platform 230 may obtain the monitoring information of a target area by the sensor network platform.

The target area refers to one or more locations or areas that need to be monitored. For example, the target area may include a road, a construction site, a residential area, a shopping mall, an office place, or the like.

The monitoring information refers to the information that reflects various real-time situations in the target area. The real-time situation may be one or more combinations of traffic conditions, pedestrian flow conditions, weather conditions, geological conditions, etc. The form of monitoring information may be one or more combinations of images, videos, voices, texts, or the like.

In some embodiments, the rescue management platform 230 may obtain the monitoring information of the target area through the sensor network platform 210.

In some embodiments, the rescue management platform 230 may access the Internet (e.g., urban Internet of things website, news website, etc.) or database (e.g., databases for the urban Internet of things) to obtain monitoring information through the sensor network platform 210.

In some embodiments, the rescue management platform 230 may access the object monitoring platform 220 through the sensor network platform 210 and obtain monitoring information photographed by a monitoring device located in a target area from the object monitoring platform 220. For more descriptions of the sensor network platform 210, the object monitoring platform 220, and the rescue management platform 230, refer to the aforementioned FIG. 2 related to the Internet of Things, here are not repeated.

In some embodiments, the object monitoring platform may include one or more monitoring devices. The monitoring device may include but is not limited to, a combination of one or more devices such as a surveillance camera, a panoramic camera, and an unmanned aerial vehicle (UAV).

In some embodiments, one or more monitoring devices may be set at a specified location in the target area. For example, one or more monitoring devices may be set at intersections in the target area; for another example, one or more monitoring devices may be set at accident-prone locations (such as ramps, sharp turns, etc.) in the target area. In some embodiments, the monitoring device(s) may be fixed. For example, the monitoring device(s) may be fixedly installed on a support of the intersection. In some embodiments, the monitoring device(s) may be mobile. For example, a monitoring device may be a UAV, which may move according to a user's operation instructions; as another example, the monitoring device may be installed on a vehicle. In some embodiments, the monitoring device(s) may obtain the monitoring information in real-time. In some embodiments, the monitoring device(s) may obtain the monitoring information according to a time interval (e.g., an interval of 10 seconds, an interval of 1 minute, etc.) set by a user.

The method described in some embodiments of the present disclosure may include obtain monitoring information through various platforms of the Internet of things, which may quickly obtain monitoring information and ensure the security of data transmission by using the cooperation ability of the Internet of things.

In some embodiments, the rescue management platform 230 may determine an area type of the above target area. When the target area is a preset type (such as a confidential area, a school, a hospital, etc.), the sensor network platform may encrypt and transmit the monitoring information. The encrypted transmission mode may include one or more modes, such as a singular value decomposition mode, a cipher block chaining mode, or the like.

The method described in some embodiments of the present disclosure can improve the security of data transmission and avoid the leakage of important information by encrypting the preset type of target area.

In 320, the rescue management platform 230 may judge whether an abnormal accident occurs in the target area based on the monitoring information.

An abnormal accident refers to an event that affects the normal operation of production activities or transportation activities in the target area. For example, there are obstacles on the road, rear-end collisions of vehicles, leakage of dangerous objects, landslides, etc.

The judgment of abnormal accidents may be realized manually or automatically. In some embodiments, a user (e.g., an expert, a technician) may determine whether an abnormal accident occurs based on the monitoring information. For example, a user observed that there is a cloud of smoke in a certain position in a monitoring image, and may judge a fire accident occurs. In other embodiments, the rescue management platform 230 may determine whether an abnormal accident has occurred through a judgment model.

As shown in FIG. 4, a judgment model 420 may analyze and process the input of monitoring information 410 in the target area, and output a judgment result 430 of whether an abnormal accident occurs in the target area.

In some embodiments, the judgment model 420 may include, but is not limited to, one or more combinations of three-dimensional convolutional neural networks (3D CNN), decision trees (DT), linear regressions (LR), or the like.

In some embodiments, a sequence of monitoring information 410 in the target area obtained in different periods (e.g., within 5 minutes before the accident, from the time of the accident to 10 minutes after the accident, etc.) may be used as the input of the judgment model 420, the judgment result 430 of whether an abnormal accident occurs in the target area is used as the output of the judgment model 420.

The parameters of the judgment model 420 may be obtained by training. In some embodiments, a plurality of groups of training samples may be obtained based on a large amount of monitoring information, and each group of training samples may include a plurality of training data and labels corresponding to the training data. The training data may include the monitoring information (such as a monitoring video), and the labels may be the judgment results of whether abnormal accidents occur based on the historical monitoring information. For example, processing device may collect the monitoring information of multiple time points in a historical time period (such as one day, one week, one month, etc.) as training data to obtain the judgment results (for example, the judgment results of whether abnormal accidents occur are marked manually according to the monitoring information) of whether abnormal accidents occur in the monitoring information.

In some embodiments, the parameters of the initial judgment model may be iteratively updated based on a plurality of training samples to make the loss function of the model meet the preset conditions. For example, the loss function converges, or the loss function value is less than a preset value. When the loss function meets the preset conditions, the module training is completed to obtain a well-trained judgment model 420.

In 330, the rescue management platform 230 may determine an accident type of the abnormal accident when the abnormal accident occurs in the target area.

In some embodiments, the accident type refers to a type to which the abnormal accident belongs. Exemplary accident types may include: vehicle accidents, construction accidents, road accidents, natural disaster accidents, fire accidents, geological disaster accidents, or the like. For example, vehicle rear-end, vehicle rollover, etc., may belong to vehicle accidents; building collapse and building shaking may belong to construction accidents; obstacles on the road and defects on the road surface may belong to road accidents; heavy precipitation and hail may belong to natural disaster accidents; forest fire, urban fire, combustible leakage, etc., may belong to fire accidents; landslides and debris flows may belong to geological disaster accidents.

In some embodiments, users (e.g., experts, technicians) may determine whether an abnormal accident occurs based on the monitoring information. For example, if a user observes that a huge stone appears on a road in the monitoring image, he/she may rely on historical experience to judge that the abnormal accident belongs to a road accident and a geological disaster accident.

In other embodiments, the rescue management platform 230 may determine the accident type of the abnormal accident through the judgment model.

As shown in FIG. 4, the judgment model 420 may also analyze and process the obtained monitoring information 410 of the target area, and determine the accident type 440 of the abnormal accident when it is determined that the abnormal accident occurs in the target area.

In some embodiments, the input of the judgment model 420 may be the monitoring information 410 (e.g., road monitoring video, etc.) of the target area, and the output may include the accident type 440 (e.g., a vehicle accident, a construction accident, a road accident, a natural disaster accident, a fire accident, etc.) of the abnormal accident in addition to the judgment result 430 of whether an abnormal accident occurs in the target area. For example, the input of the judgment model 420 may be a monitoring video with thick smoke on the road, and the output may be that an abnormal accident occurs on the road, and the accident type of the abnormal accident is a fire accident.

In some embodiments, the training data of the initial judgment model may include monitoring information (e.g., monitoring videos), and the labels may be the accident types of abnormal accidents determined based on the historical monitoring information in addition to the judgment results of whether an abnormal accident occurs based on the historical monitoring information. For example, the processing device may collect the monitoring information at multiple time points in a historical time period (such as one day, one week, one month, etc.) as training data to obtain the judgment results of the accident type of an abnormal accident (such as the accident type directly marked manually according to the monitoring information). In some embodiments, the parameters of the initial judgment model may be iteratively updated based on a plurality of training samples to make the loss function of the model meet the preset conditions, for example, the loss function converges, or the loss function value is less than the preset value. When the loss function meets the preset conditions, the module training is completed to obtain a well-trained judgment model 420.

By using the method described in some embodiments of the present disclosure, the accident type can be quickly obtained by analyzing the monitoring video through the model, enabling the rescuer to understand timely the abnormal accident situation, and improving the follow-up rescue efficiency.

In 340, the rescue management platform 230 may generate rescue reminder information based on the accident type, wherein the rescue reminder information includes a rescue mode of the abnormal accident.

The rescue reminder information refers to reminder information that reminds relevant rescuers to carry out a rescue. A rescuer refers to a person or department (such as a fire department, medical personnel, a transportation department, etc.) that performs rescue in an abnormal accident. For example, there was a fire accident occurred in building B in city A, the rescue management platform 230 may determine the rescue reminder information: a fire broke out in building B in city A around 10:00 am, the fire department needs to go to there for the rescue.

In some embodiments, the rescue management platform 230 may generate the rescue reminder information based on the accident type, wherein the rescue reminder information includes the rescue mode of the abnormal accident. In some embodiments, the form of rescue reminder information may be a combination of one or more forms including but not limited to a short message, a text, an image, a video, a voice, a broadcast, or the like.

A rescue mode refers to the mode that may alleviate or solve the abnormal accident or the consequences caused by the abnormal accident. The rescue mode may include a rescuer and rescue means. For example, a rescue mode of a fire accident may be: firefighters carry professional fire-fighting equipment to the rescue site to extinguish the fire, and medical personnel carry first-aid equipment to the rescue site to rescue the wounded.

In some embodiments, users of the accident rescue command center (e.g., experts and technicians) may judge the rescue mode based on the accident type. For example, based on the type of road accident, the user may determine the rescue mode based on previous handling experience: the road rescue department may carry professional obstacle cleaning equipment or trailer equipment to clean the road.

In other embodiments, the rescue management platform 230 may determine the rescue mode corresponding to the current accident type by querying the historical rescue modes corresponding to the accident types of the historical abnormal accidents stored in the database.

In some embodiments, the rescue management platform 230 may also obtain other relevant information about the abnormal accident. Other relevant information may include: accident type, weather conditions of the rescue location, positioning information of the rescue location, navigation to the rescue location, and other information.

In some embodiments, the rescue management platform 230 may integrate other relevant information with rescue modes and abnormal accidents to generate the rescue reminder information.

In 350, the rescue management platform 230 may send the rescue reminder information to a rescuer.

In some embodiments, the rescue management platform 230 may send the rescue reminder information to the rescuer in one or more forms, including sending a short message, a text, an image, a video, a voice, a broadcast, or the like to the rescuer's terminal or communication devices. In some embodiments, the rescue management platform 230 may send the rescue reminder information to the rescuer within a preset time after the accident (e.g., 5 minutes, 10 minutes, etc.).

By using the method of some embodiments of the present disclosure, whether the abnormal accident occurs and the type of accident can be quickly and accurately determined, and the rescue party can be informed in time, so that the rescuer can quickly solve abnormal accidents, improve the efficiency of rescue, and avoid greater economic losses and more casualties.

FIG. 5 is an exemplary flowchart illustrating an exemplary process for determining a degree of area congestion according to some embodiments of the present disclosure. In some embodiments, the process 500 may be performed by the rescue management platform 230. As shown in FIG. 5, the process 500 includes the following processes:

In 510, the rescue management platform 230 may obtain road monitoring information of each road in a preset road network area corresponding to the target area within a preset time period.

The preset road network area refers to the road network area within the preset range around the target area. For example: all roads within the whole range of multiple intersections and scenic spots within 2 km from the school. In some embodiments, a preset road network area may include one or more roads.

In some embodiments, the preset road network area may include one or more combinations of an area located within the target area, an area within a specific radius centered on the target area, and an area covered by one or more roads leading to the target area. For example, a road area in the eastern part of a central business district; a road area with a radius of 3 km with the hospital as the center; an area covered by Road A and Road B leading to a school.

The preset time period refers to the time range related to abnormal accidents preset by the user. For example, within 5 minutes before the occurrence of an abnormal accident, within 10 minutes before the rescuer's departure, or the like.

Road monitoring information refers to information that reflects various conditions of roads or intersections in the preset time period. A condition of roads or intersections in the preset time period may include one or more combinations of a condition of traffic flow, vehicle speed, pedestrian flow, traffic lights, traffic accidents, construction blocking, etc., within the preset time period. The form of road monitoring information may be one or more combinations of a video, an image, a voice, a text, or the like. For example, a monitoring video of all roads within 300 m of an intersection within 5 minutes after the occurrence of an abnormal accident.

In some embodiments, the rescue management platform 230 may obtain road monitoring information through the sensor network platform 210. For more instructions on obtaining road monitoring information, refer to FIG. 3 for obtaining monitoring information and its related descriptions, which are not repeated here.

In 520, the rescue management platform 230 may determine a degree of road congestion of the each road caused by the abnormal accident in a target time period based on the road monitoring information.

The target time period refers to the time period in which the degree of road congestion needs to be determined in the future, for example, within 5 minutes after the occurrence of an abnormal accident, within 2 minutes after the rescuer's departure.

The degree of road congestion refers to the evaluation used to characterize the congestion of each road caused by abnormal accidents in the target area. For example, the degree of road congestion may be expressed as a number in the range of 0-100. In the case of smooth road, the degree of road congestion may be 0. In the case of severe congestion of the road, the degree of road congestion may be 100.

In some embodiments, the degree of road congestion may be determined based on relevant information of road monitoring information. Relevant information may include: a type of an intersection (e.g., a crossroad, an intersection with a sidewalk, an annular intersection, etc.), the situation of a traffic signal in the intersection (e.g., whether there are traffic lights, change interval of traffic lights, etc.), the length of a road, the count of vehicles in the road or intersection at the current time, the traffic flow (e.g., 63 vehicles/min, 278 vehicles/h), whether an abnormal accident occurs (e.g., a rear-end accident occurred in Section B), whether there is construction, etc.

In some embodiments, the rescue management platform 230 may obtain a manual determination result. Users (such as experts and technicians) may judge the degree of road congestion based on the road monitoring information. For example, a user may observe the road monitoring information and judge that the degree of road congestion is 10.

In some embodiments, the rescue management platform 230 may determine the count of vehicles and traffic flow of the each road in the preset road network area within the preset time period based on the road monitoring information; determine the degree of road congestion of the each road caused by the abnormal accident in the target time period through the prediction model based on the count of vehicles and the traffic flow of the each road in the preset road network area within the preset time period, the prediction model may be a machine learning model. For more descriptions of above embodiments refer to FIGS. 6A and 6B and their related descriptions, which are not repeated here.

In 530, the rescue management platform 230 may determine a degree of area congestion of the preset road network area caused by the abnormal accident in the target time period based on the degree of road congestion.

The degree of area congestion refers to the evaluation reflecting the degree of road congestion caused by abnormal accidents in the target area. In some embodiments, the degree of area congestion may be described by vocabulary. For example: smooth, slow, congestion, and severe congestion. In other embodiments, the degree of area congestion may be represented by numbers, for example, a number in the range of 0-100. In the case where each road in the target area is smooth, the degree of regional congestion may be 0. In the case of severe road congestion in the target area, the degree of congestion may be 100. As another example, set 60 km/h for the normal speed of a vehicle, the degree of area congestion is 1. When the average speed of vehicles in each intersection or road in the target area is more than 60 km/h, the degree of area congestion is less than 1 (e.g., 0.8); when the average speed of vehicles in each intersection or road in the target area is less than 60 km/h, the degree of area congestion is greater than 1 (for example, 1.3). In some embodiments, the rescue management platform 230 may use different colors or logos to represent different area congestion levels and display them on the display screen of the terminal device. For example, "smooth" may be expressed in green, "slow" may be expressed in yellow, "congestion" may be expressed in red, and "severe congestion" may be expressed in crimson.

In some embodiments, the rescue management platform 230 may determine the degree of area congestion of the preset road network area caused by the abnormal accident in the target time period based on the degree of road congestion; the degree of area congestion may be determined manually or automatically. In some embodiments, the rescue management platform 230 may determine the degree of area congestion based on the degree of road congestion through manual experience. For example, the industry experts rely on experience to determine the degree of area congestion based on the degree of road congestion. In some embodiments, the rescue management platform 230 may determine the current degree of area congestion based on historical data. The historical data may include at least one historical degree of road congestion and the corresponding degree of area congestion. When the degree of the road congestion of each road in a certain area in the historical data is similar to the current degree of road congestion, the rescue management platform 230 may determine the degree corresponding to the area in the historical data as the current degree of area congestion.

In some embodiments, the rescue management platform 230 may determine the degree of area congestion based on the average degree of road congestion in the target area. For example, there are Road A, Road B, and Road C in the target area. If the degree of road congestion of Road A is 23, the degree of road congestion of Road B is 37 and the degree of road congestion of Road C is 81, the degree of area congestion is the average degree of the three, that is, 47.

In some embodiments, the rescue management platform 230 may also determine the degree of area congestion based on the weighted average degree of road congestion in the target area. The weight may be determined by the number of branches or intersections of each road in the target area. For example, if the number of intersections located on Road A accounts for 40% of the number of all intersections in the target area, the weight of the degree of road congestion on Road A is 0.4. The weight may also be determined by the historical average traffic flow of each road in the target area. For example, if the historical average traffic flow of Road A accounts for 20% of the historical average traffic flow of all roads in the target area, the weight of the degree of road congestion on Road A is 0.2.

In 540, the rescue management platform 230 may start traffic emergency treatment when the degree of area congestion is greater than a preset degree threshold. In some embodiments, the process 540 may be performed by the rescue management platform 230.

The preset degree threshold refers to the preset minimum degree of area congestion that may trigger traffic emergency treatment. For example, the preset degree threshold may be set as congestion, severe congestion, etc., and may also be set as 1.2, 1.8, etc. In some embodiments, the preset degree threshold may be set according to the difference values under different road conditions. Generally, the more complex (for example, there are many intersections on the road)

the road situation is, the lower the preset degree threshold is. In some embodiments, a preset degree threshold may be set according to historical data. The historical data may include the degree of area congestion when starting traffic emergency treatment in the preset road network area in several historical periods. The rescue management platform 230 may obtain the lowest degree of area congestion as the preset degree threshold.

In some embodiments, the processing device 110 may start traffic emergency treatment when the degree of area congestion is greater than a preset degree threshold, for example, the degree of congestion is greater than 60, and the degree of congestion is more serious than "slow".

In some embodiments, when emergency treatment needs to be started, the rescue management platform 230 may generate congestion reminder information based on the degree of road congestion of each road in the target time period. The congestion reminder information may include the roads that need to be bypassed in the preset road network area. In some embodiments, when the degree of road congestion of at least one road exceeds a preset degree threshold, the rescue management platform 230 may determine that the at least one road needs to be bypassed. In some embodiments, when at least one road is blocked by road construction, the rescue management platform 230 may determine that the at least one blocked road needs to be bypassed.

In some embodiments, the rescue management platform 230 may send the congestion reminder information to a target terminal in the preset road network area. The target terminal may include a traffic information display terminal set on each road, a vehicle navigation system for users in a road network area, a mobile terminal of the rescuer, a media (such as a radio, a television and a website) related to the road network information prompt. The way of reminder includes one or more forms such as a short message, a pushed text, images, videos, a voice, and a broadcast.

By using the method described in some embodiments of the present disclosure, the degree of area congestion can be quickly and accurately judged in the preset road network area corresponding to the target area. If necessary, traffic emergency treatment can be started in time to alleviate the degree of road congestion and improve rescue efficiency.

It should be noted that the aforementioned process description of emergency treatment is merely for example and description, without limiting the scope of this specification. For those skilled in the art, various modifications and changes can be made to the process of emergency treatment under the guidance of the present disclosure. However, these amendments and changes are still within the scope of the present disclosure. For example, the rescue management platform 230 may generate road restriction information to restrict vehicles from entering the preset road network area. The rescue management platform 230 may also generate road construction improvement information to put forward suggestions for the improvement and construction of pavement space (such as widening roads, increasing underpass tunnels, etc.).

Figure 6A:
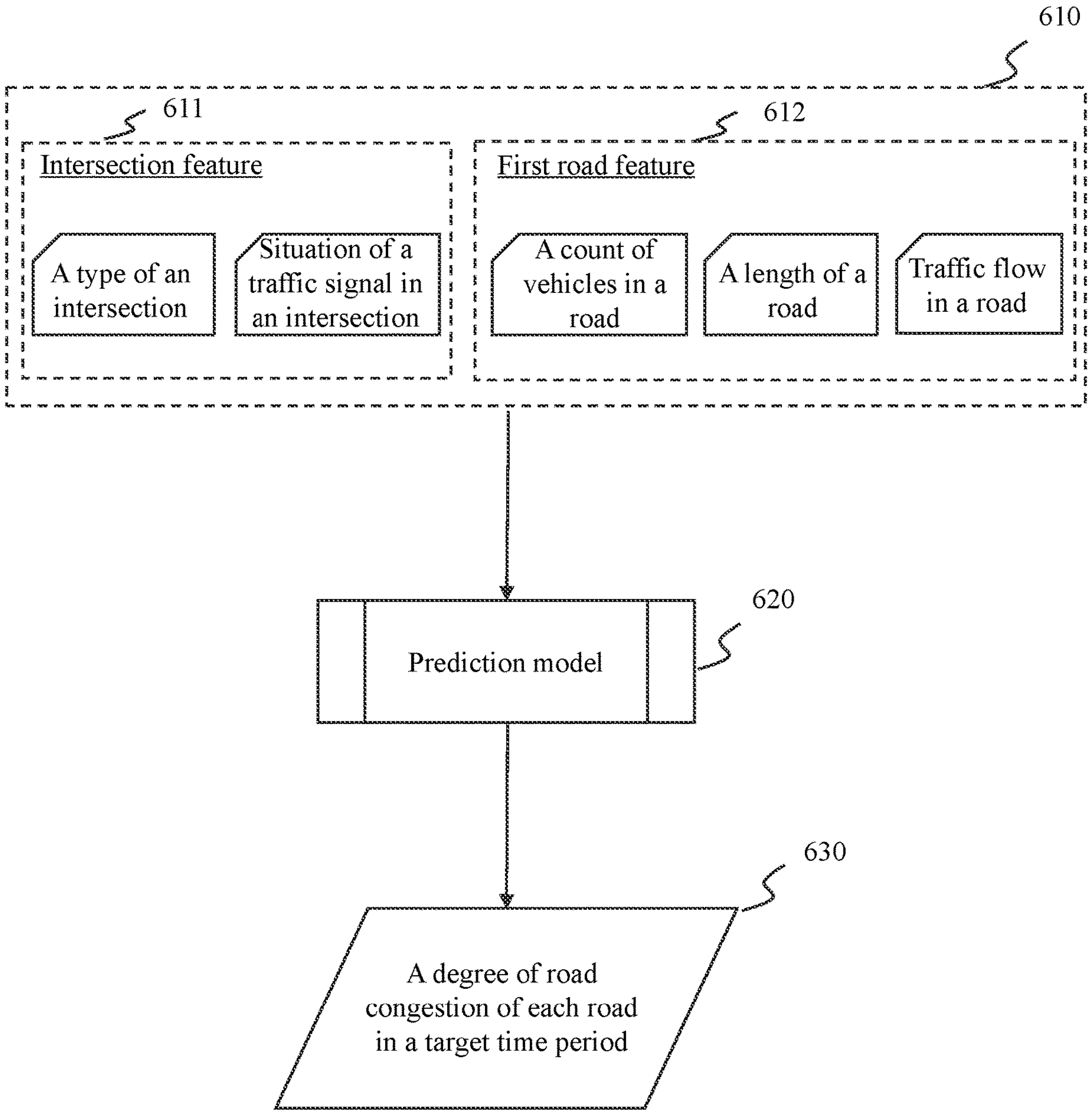
FIG. 6A is a schematic diagram illustrating an exemplary degree of road congestion according to some embodiments of the present disclosure.
Figure 6B:
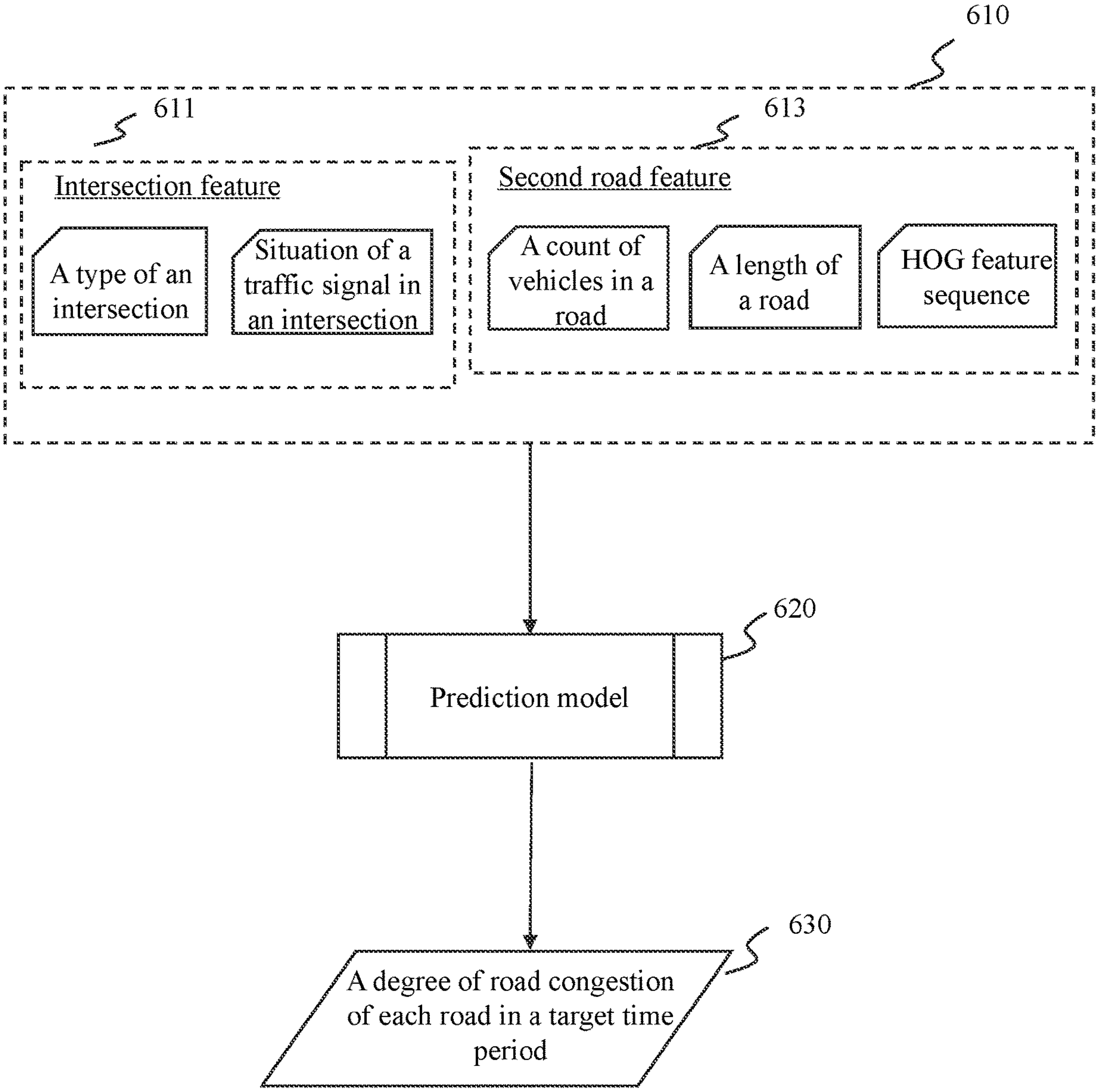
FIG. 6B is a schematic diagram illustrating exemplary another degree of road congestion according to some embodiments of the present disclosure.

FIG. 6A and FIG. 6B are schematic diagrams illustrating exemplary determination of the degree of road congestion based on the prediction model according to some embodiments of the present disclosure.

In some embodiments, the rescue management platform 230 may determine degree of road congestion of the each road caused by the abnormal accident in the target time period based on the road monitoring information.

In some embodiments, the road monitoring information in one or more preset time periods may be analyzed and processed through the prediction model to obtain the degree of road congestion of each road caused by the abnormal accident in the target time period. In some embodiments, the prediction model may be a graph neural network model.

As shown in FIG. 6A, input data 610 of the prediction model 620 may be the intersection feature 611 of an intersection, and first road feature 612 of a road between the intersections represented by a graph in the sense of graph theory. The aforementioned graph is a data structure composed of nodes and edges, which may include multiple nodes and multiple edges/paths connecting the multiple nodes. A node corresponds to the intersection feature 611 and an edge corresponds to the first road feature 612. The output data is the degree of road congestion 630 of the each road caused by the abnormal accident in target time period. The intersection feature 611 may be the type (such as a crossroads, an intersection with a sidewalk, an annular intersection, etc.) of intersection, the situation (whether there are traffic lights, change interval of traffic lights, etc.) of traffic signals in the intersection, or the like; the first road feature 612 may be the count of vehicles in a road, the traffic flow (e.g., 63 vehicles/min, 278 vehicles/h) in a road, the length of a road, or the like. The traffic flow in a road refers to the count of vehicles passing through a certain road section in unit time, the traffic flow in a road may be the count of passing vehicles divided by time. The intersection feature 611 and the first road feature 612 may be obtained based on the road monitoring information. For example, the type of intersection of road monitoring information may be determined based on image recognition technology. In some embodiments, the count of vehicles and the traffic flow of the each road in the preset road network area within the preset time period may be determined based on the road monitoring information. In some embodiments, the road monitoring information may be analyzed and processed to determine the count of vehicles and the traffic flow of the each road in the preset road network area within the preset time period. In some embodiments, the road monitoring information may be processed based on the first determination model, the count of vehicles on the each road in the preset road network area within the preset time period may be determined, the first determination model may be a machine learning model. For more information about processing the road monitoring information based on the first determination model, determining the count of vehicles on the each road in the preset road network area within the preset time period, refer to FIG. 7 and its related description, which are not repeated here. In some embodiments, the road monitoring information may be processed based on a second determination model, the traffic flow of the each road in the preset road network area within the preset time period may be determined, the second determination model may be a machine learning model. For more information about processing the road monitoring information based on the second determination model, determining the traffic flow of the each road in the preset road network area within the preset time period, refer to FIG. 8 and its related description, which are not repeated here.

The parameters of the prediction model 620 may be trained by a plurality of labeled training samples. In some embodiments, a plurality of groups of training samples may be obtained, and each group of training samples may include a plurality of training data and labels corresponding to the training data. The training data may include the historical intersection features of intersections and the historical first road features of roads between the intersections represented by the graph in the sense of graph theory in the historical period. The label of the training data may be the historical degree of road congestion of each road in the graph. In some embodiments, the parameters of the initial prediction model may be iteratively updated based on a plurality of training samples to make the loss function of the model meet the preset conditions. For example, the loss function converges, or the loss function value is less than the preset value. When the loss function meets the preset conditions, the module training is completed to obtain a well-trained prediction model 620.

As shown in FIG. 6B, the input data 610 of the prediction model 620 may be the intersection feature 611 of the intersection and the second road feature 613 of the road between the intersections represented by a graph in the sense of graph theory. The aforementioned graph is a data structure composed of nodes and edges, which may include multiple nodes and multiple edges/paths connecting multiple nodes. A node corresponds to the intersection feature 611 and an edge corresponds to the second road feature 613. The second road feature 613 may include the count of vehicles in a road, a feature sequence of a histogram of oriented gradient (HOG), a length of a road, or the like. In some embodiments, the second road feature 613 may also be obtained based on the road monitoring information.

HOG feature is characterized by calculating and counting the gradient direction histogram in the local area of the image. The HOG feature sequence in the present disclosure refers to a sequence constructed in the HOG feature vector of each frame in the monitoring video. The extraction process of the HOG feature sequence includes the following processes.

Firstly, the road monitoring information of a road, such as the multi-frame image of a monitoring image, is grayed. That is, the image is regarded as a three-dimensional image of z=f (x, y), where Z is grayscale. Secondly, the whole image may be normalized by Gamma Correction Method. The purpose of normalization is to adjust the contrast of the monitoring image, and reduce the influence caused by the local shadow of the image and illumination change of the image. At the same time, it may suppress the interference of noise. Then, the gradient (including size and direction) of each pixel point in the image may be calculated. For example, the one-dimensional Sobel operator may be directly used to calculate the horizontal and vertical gradients of a pixel point, and then the gradient amplitude and direction of the pixel point may be obtained. It should be noted that an absolute value may be taken for the gradient direction, so the angle range is [0°, 180°]. Then, the monitoring image may be divided into several cell units (for example, one cell unit is 4×4 pixels), and the gradient histogram of each cell unit may be calculated. In some embodiments, each pixel point in the cell unit may vote for a direction-based histogram channel. The voting adopts the method of weighted voting, that is, each vote has a weight value, which is calculated according to the gradient amplitude of the pixel point. In some embodiments, an amplitude itself or its function (such as the square root of the amplitude, the square of the amplitude, the truncated form of the amplitude, etc.) may be used to represent the weight value. In some embodiments, the cell unit may be rectangular or star shaped. The histogram channels are evenly distributed in the angle range of 0-180° (undirected) or 0-360° (directed). For example, in the range of 0-180° (undirected), the angle range may be divided into 9 parts (that is, 9 bins), and each 20° is a unit, that is, these pixels may be divided into 9 groups according to the angle. The gradient values corresponding to all pixels in each part may be accumulated, and 9 values may be obtained. The histogram is an array composed of these 9 values, corresponding to the angles 0-20°, 20-40°, 40-60°, 60-80°, . . . , 160-180°. Next, the block is then normalized. The pixel region of the a×a is first used as a cell unit, and then the b×b cell unit is used as a group, referred to as a block. For example, a region of 4×4 is used as a cell unit, and then 2×2 cell units as a group may be used as a block. In a block, the number of values is $N*b^2$. The number of values of the gradient histogram in each cell is N, and the number of cell cells in each block is $b^2$. For example, the gradient histogram of each cell unit in the aforementioned example has 9 values, and if each block has 4 cell units, a block has 36 values. The HOG obtains blocks by sliding windows, wherein the blocks have overlapping. A block has $b^2$ histograms, these $b^2$ histograms may be spliced into a vector with a length of $N*b^2$, and then this vector is normalized. For example, a block has 4 histograms, and these 4 histograms are spliced into a vector with a length of 36. The normalization method of the vector may be to divide each element of the vector by the L2-norm of the vector. Finally, the HOG feature vector is calculated, all overlapping blocks in the image for HOG features are collected to combine them into the final feature vector. That is, a block is obtained by sliding each time, and a feature vector with a length of $N*b^2$ is obtained (for example, the above-mentioned vector with a length of 36), and the feature vectors of all blocks are spliced to obtain the HOG feature vectors. The HOG feature vector of each frame in the surveillance video may form a HOG feature sequence.

Correspondingly, when training the prediction model 620 whose edge feature in the input data of the prediction model 620 is the second road feature 613, the historical first road feature in the training sample may be replaced with the historical second road feature. For other training process, refer to the training process of prediction model 620 described above, which is not repeated here.

In some cases, the road is too long, which may cause the characteristics of different parts of the road to vary too much. For example, the traffic flow varies greatly. In some embodiments, if a length of a road is greater than a preset threshold, the rescue management platform 230 may divide the road. A sub-road between the divided locations may be regarded as a road, and the divided locations may be used as intersections.

By using the method described in some embodiments of the present disclosure, the degree of area congestion can be further accurately predicted by analyzing the degree of area congestion through the model, and the waste of manpower can be effectively reduced. The rapid start of traffic emergency treatment can ensure the normal road traffic and avoids the imminent blockage or the further aggravation of the existing blockage, and helps the rescuer quickly arrive at the scene of the abnormal accident.

Figure 7:
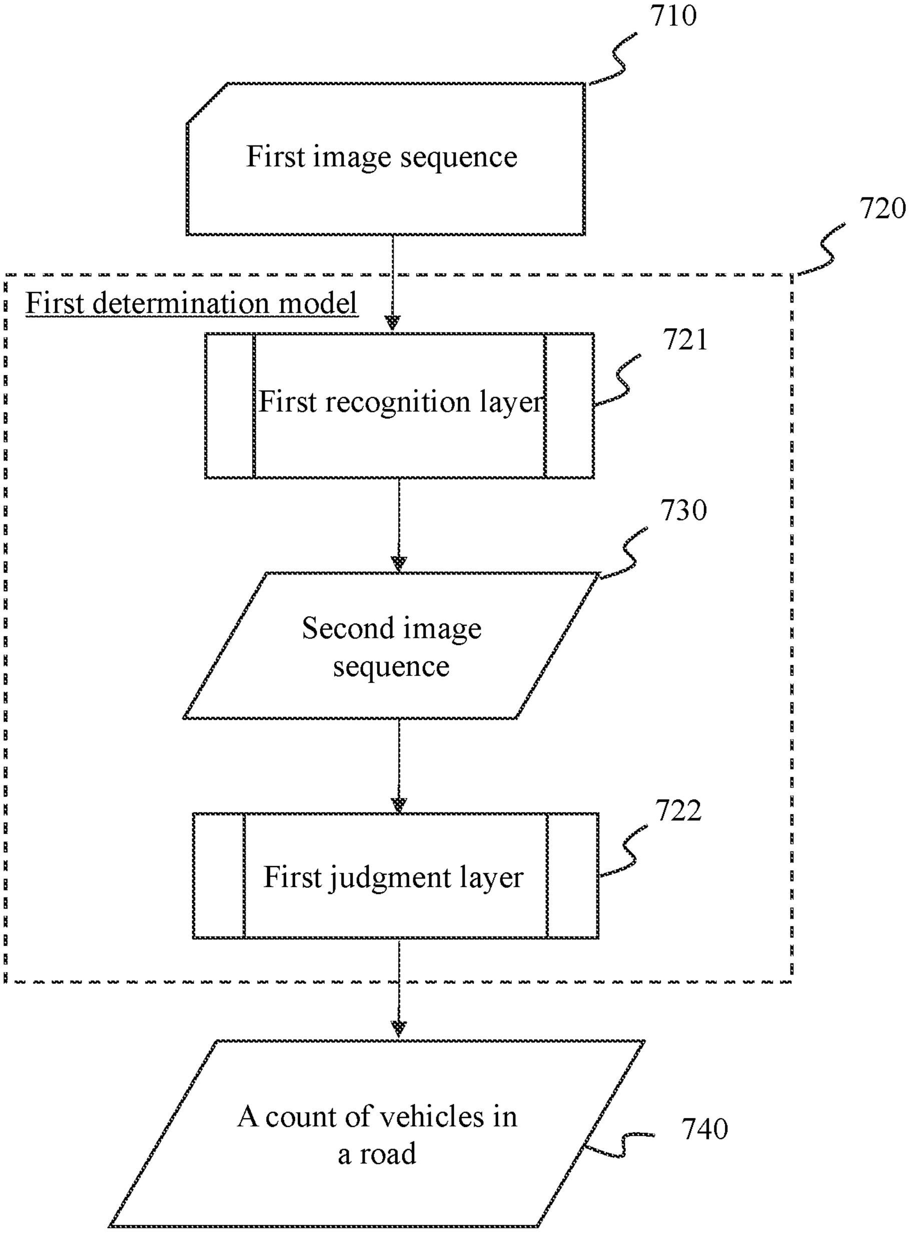
FIG. 7 is a schematic diagram illustrating an exemplary method for determining a count of vehicles in a road according to some embodiments of the present disclosure.

FIG. 7 is a schematic diagram illustrating an exemplary method for determining the count of vehicles in a road according to some embodiments of the present disclosure.

As shown in FIG. 7, the count of vehicles in a road within the preset time period may be determined by the first determination model 720. In some embodiments, when the road monitoring information includes a monitoring video of a certain road, the first determination model 720 may process the input of first image sequence 710 and output the count of vehicles 740 in a road within the preset time period. The first image sequence 710 may include each frame image of the monitoring image of a certain road in the preset time period, which may be determined based on the monitoring video.

In some embodiments, the first determination model 720 may include a first recognition layer 721 and a first judgment layer 722.

The first recognition layer 721 may process each frame image of the monitoring image in the road monitoring information, determine each object, and segment each object. The input of the first recognition layer 721 may be the first image sequence 710, and the output of the first recognition layer 721 may be the second image sequence 730 with object segmentation mark information. The object segmentation mark information may include several object boxes and the corresponding categories of the object boxes. In some embodiments, the first recognition layer 721 may be a You only look once (YOLO) model.

The first judgment layer 722 may analyze the second image sequence 730 and judge whether multiple object boxes in the front and rear images in the sequence are the same object, so as to determine the number of vehicles 740 in the road within the preset time period. The input of the first judgment layer 722 may be the second image sequence 730 with object segmentation mark information obtained based on the recognition layer, and the output may be the number of vehicles 740 in the road within the preset time period. In some embodiments, the first judgment layer 722 may be a combination of a convolutional neural network (CNN) and a deep neural network (DNN).

In some embodiments, the rescue management platform 230 may use the feature extraction algorithm and feature similarity calculation to determine whether the object in several object boxes in the second image sequence 730 is the same object. First, the rescue management platform 230 may obtain the feature vector of each object box through feature extraction (e.g., HOG algorithm), and then judge whether it is the same object based on the similarity (e.g., the calculation of the Euclidean distance) between the feature vectors of object boxes. For example, two object boxes A and B are identified from the 10th frame of the first image sequence 710, and the category is a vehicle; in the 20th frame of the first image sequence 710, two object boxes C and D are identified, and the category is also a vehicle. After inputting object boxes A, B, C, and D into the first judgment layer 722 respectively, it is found that the similarity between object box A and object box C is greater than the preset threshold, then A and C may be considered as the same vehicle.

In some embodiments, the first recognition layer and the first judgment layer may be obtained through joint training. For example, by inputting training samples to the first recognition layer, and the training samples may be several first image sequences of historical time periods (i.e., road monitoring videos of multiple historical time periods). Then, the output of the first recognition layer is input into the first judgment layer, and a loss function is constructed based on the output of the first judgment layer and the label. The label may be the count of vehicles in the first image sequence determined by manual labeling. Until the preset conditions are met, the training is completed. After the training is completed, the parameters of the first determination model may also be determined. The preset conditions may be that the loss function of the updated first judgment layer is less than a threshold, converges, or the number of training iterations reaches a threshold.

In some embodiments, the first determination model 720 may also be pre-trained by the rescue management platform 230 or a third-party and stored in the storage device 130, and the rescue management platform 230 may directly call the first determination model 720 from the storage device 130.

The method described in some embodiments of the present disclosure may quickly count the count of vehicles and accurately determine the degree of road congestion by identifying vehicles through models.

Figure 8:
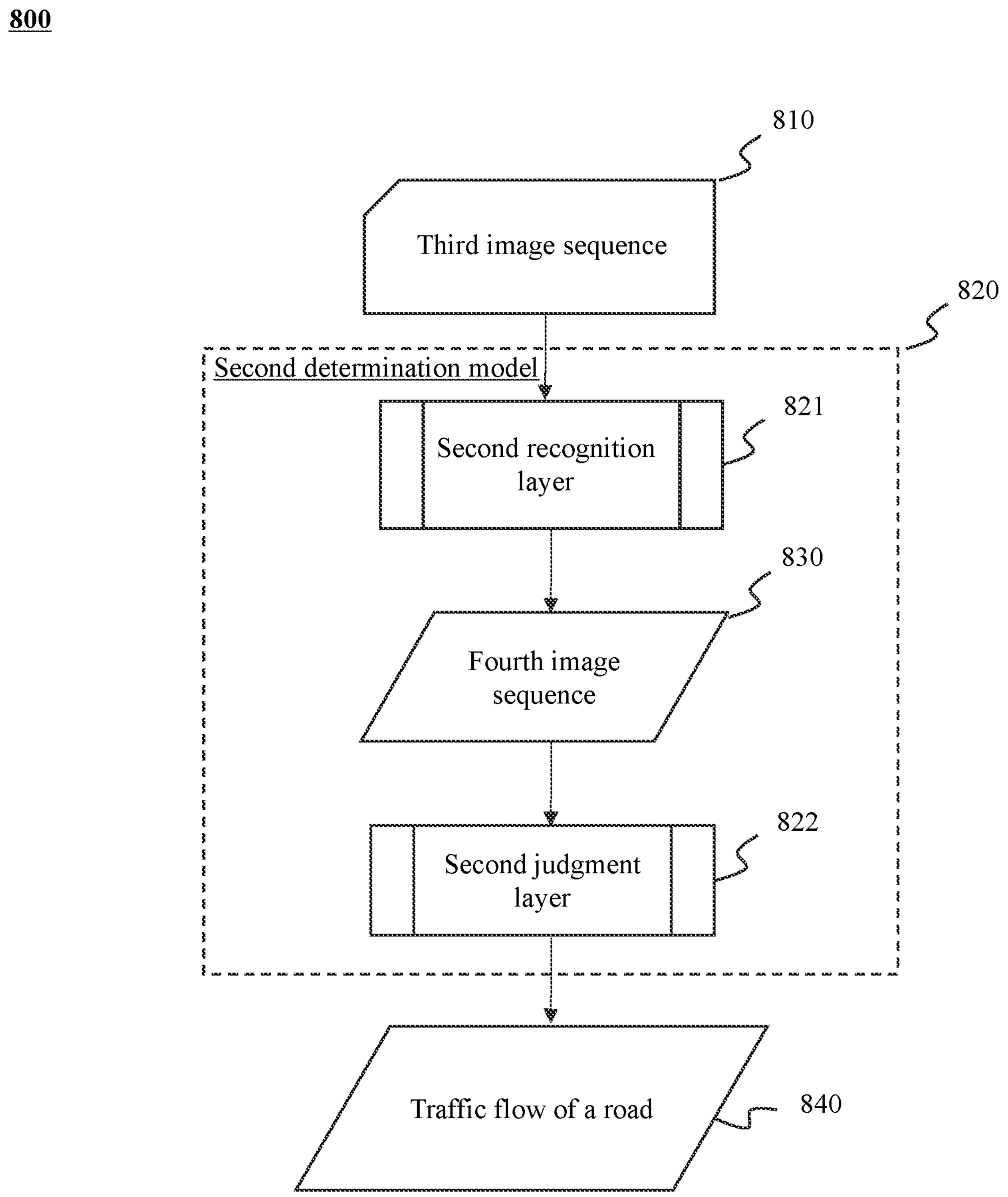
FIG. 8 is a schematic diagram illustrating an exemplary method for determining traffic flow of a road according to some embodiments of the present disclosure.

FIG. 8 is a schematic diagram illustrating an exemplary method for determining traffic flow of a road according to some embodiments of the present disclosure.

As shown in FIG. 8, in some embodiments, the traffic flow of the each road in the preset road network area within the preset time period may be determined by the second determination model 820.

In some embodiments, when the road monitoring information includes a monitoring video of a certain road, the second determination model 820 may process each frame image of the monitoring image in the inputted road monitoring information to determine the traffic flow of the road. The input of the second determination model 820 may be the third image sequence 810, and the output of the second determination model 820 may be the traffic flow 840 of the road in the preset time period.

In some embodiments, the second determination model 820 may include a second recognition layer 821 and a second judgment layer 822.

The content and implementation manner of the second recognition layer 821 is similar to that of the first recognition layer 721, the content of the third image sequence 810 is similar to that of the first image sequence 710, and the content of the fourth image sequence 830 is similar to that of the second image sequence 730. Therefore, for more information about the second recognition layer 821, the third image sequence 810, and the fourth image sequence 830, refer to FIG. 7 and its related description, which are not repeated here.

The second judgment layer 822 may analyze the fourth image sequence 830, judge whether the object box in the front and rear images in the sequence is the same object, and judge whether the object disappears in unit time.

In some embodiments, the second judgment layer 822 may include, but is not limited to, a convolution neural network model, a recurrent neural network model, a depth neural network model, or the like. Further, the input of the second judgment layer 822 may be the fourth image sequence 830 with object-segmentation mark information obtained based on the second recognition layer 821, and the output may be the traffic flow 840 of the road in the preset time period.

It is worth noting that, within a unit time, when and only when the second determination model 820 determines that the object (i.e., vehicle) in the monitoring video appears and then disappears, the object may be counted. If it is recognized that the same vehicle always exists in each frame image, the count of vehicles remains unchanged. If the same vehicle appears and then disappears, the count of vehicles increases by 1. The second recognition layer 821 may recognize each object in the monitoring video, and the second judgment layer 822 may judge whether each object is the same object and the object has disappeared.

In some embodiments, the second recognition layer and the second judgment layer may be obtained through joint training. For example, training samples may be input to the second recognition layer, and the training samples may be several fourth image sequences (i.e., road monitoring videos in unit time in multiple historical times) in the historical time period. Then, the output of the second recognition layer is input into the second judgment layer, and a loss function is constructed based on the output of the second judgment layer and the label. The label may be the traffic flow in the fourth image sequence determined by manual labeling. Until the preset conditions are met, the training is completed. After the training, the parameters of the second model may also be determined. The preset conditions may be that the loss function of the updated second judgment layer is less than a threshold, converges, or the number of training iterations reaches a threshold.

The method described in some embodiments of the present disclosure may accurately determine the degree of congestion by counting the traffic flow of roads through the model.

Figure 9:
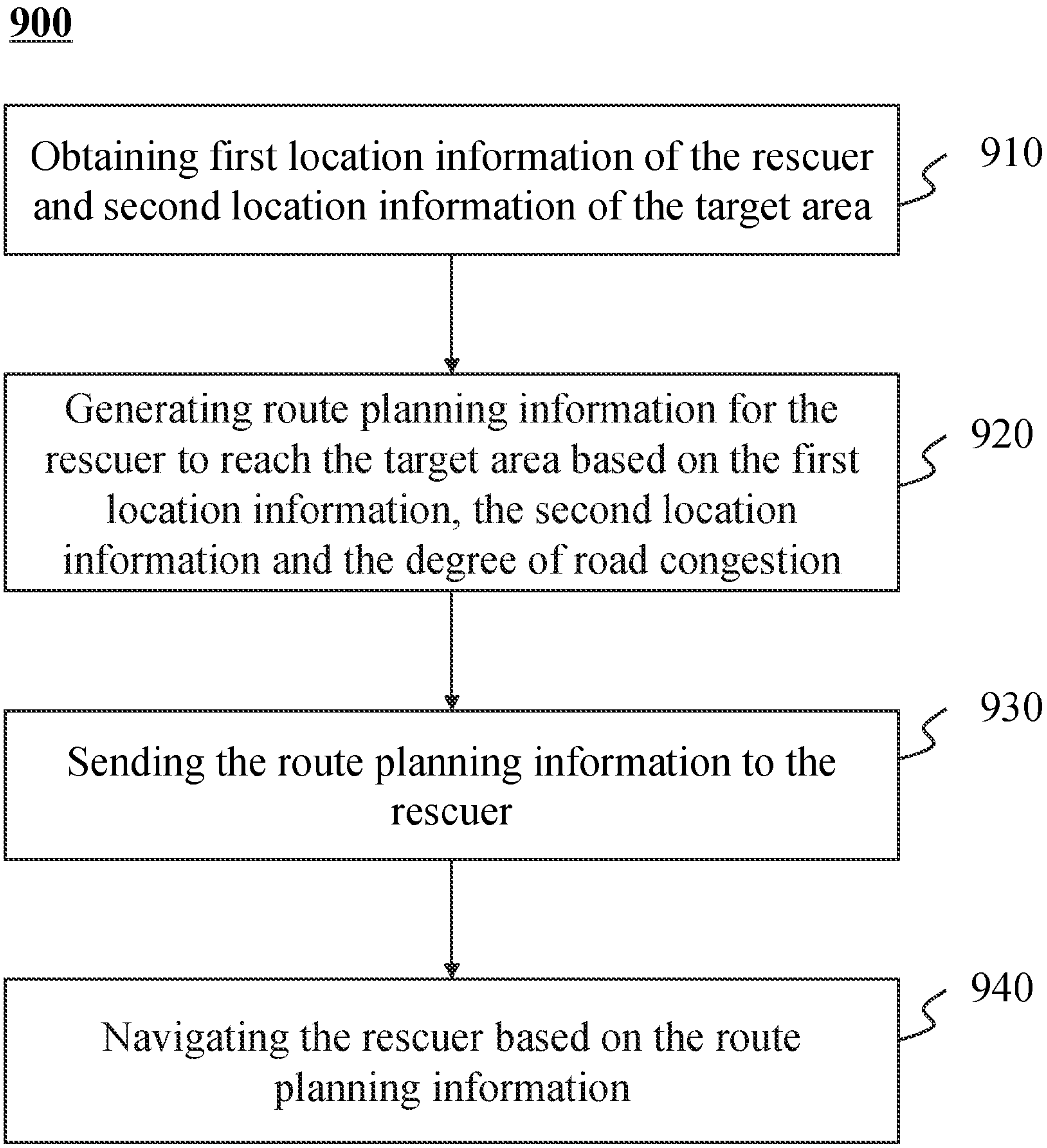
FIG. 9 is an exemplary flowchart illustrating an exemplary process for determining route planning according to some embodiments of the present disclosure.

FIG. 9 is an exemplary flowchart illustrating an exemplary process for determining route planning according to some embodiments of the present disclosure. In some embodiments, process 900 may be performed by the rescue management platform 230. As shown in FIG. 9, the process 900 includes the following processes:

In 910, the rescue management platform 230 may obtain first location information of a rescuer and second location information of the target area.

The first location information refers to departure location information based on a location of a communication device of the rescuer. The communication device refers to a device capable of mobile communication. For example, it may be a mobile device, a tablet, a laptop. As another example, the communication device may be one or more combinations of an ambulance, a fire truck, a construction vehicle, or the like. In some embodiments, the first location information may include information such as latitude and longitude, a distance, an azimuth, or the like. For example, the first location information may be expressed as the location information of a fire truck 300 m away from the monitoring point in the northeast direction. In some embodiments, the first location information may interact with other information in the rescue platform, the sensor network platform, and the object monitoring platform.

The second location information refers to destination information of the location of the target area. The target area refers to the area that may be photographed by the object monitoring platform. In some embodiments, the second location information may include information such as a location name, a device name, an azimuth, or the like. For example, the second location information may be represented as the location information of the traffic light camera at the school intersection. In some embodiments, the second location information may interact with other information in the rescue platform, the sensor network platform, and the object monitoring platform.

In some embodiments, the rescue management platform 230 may obtain the first location information of the communication device of the rescue through the sensor network platform. In some embodiments, the rescue management platform 230 may access the object monitoring platform through the sensor network platform and obtain the second location information of the monitoring device located in the target area from the object monitoring platform.

In 920, the rescue management platform 230 may generate route planning information for the rescuer to reach the target area based on the first location information, the second location information, and the degree of road congestion.

The route planning information refers to the route information planned according to a destination, a departure location, and a route strategy. The route planning information may include road network information, road condition information, a navigation mode, custom information, time information, distance information, or the like. The navigation mode may include self-driving, walking, electric vehicles, motorcycles, or the like. The custom information may include user-defined passing locations, user-defined avoidance locations, or the like. For example, the route planning information may be expressed as the route information of self-driving and then walking. For another example, the route planning information may be expressed as the distance between the place of departure and the destination is 30 km, it may take 40 minutes to drive, and it may be expected to arrive at 2 pm, according to the user-defined setting, the route planning may do not pass through the expressway. In some embodiments, the route planning information may interact with other information in the rescue platform, the sensor network platform, and the object monitoring platform.

In some embodiments, route planning may use algorithms and models to generate routes. For example, the algorithm may be a Dijkstra algorithm.

In some embodiments, during route planning, the road situation is updated based on the degree of road congestion determined by a congestion judgment model, and the corresponding route may be planned. For more description on determining the degree of road congestion through the congestion judgment model, refer to FIGS. 6A and 6B and its related description, which are not repeated here.

In 930, the rescue management platform 230 may send the route planning information to the rescuer The sending mode may include a controllable sending mode and an automatic sending mode. The automatic sending mode refers to automatically and synchronously sending route planning information. The controllable sending method refers to sending route planning information after the manual confirmation is correct. The sending form may be an H5 form, a binary form, a text form, a voice form, a video form, or the like.

In 940, the rescue management platform 230 may navigate the rescuer based on the route planning information.

In some embodiments, the rescue management platform 230 may send the route planning information to a terminal device (such as a vehicle-mounted display screen, a mobile phone, etc.) through the sensor network platform for navigation.

The method described in some embodiments of the present disclosure may judge the road congestion caused by the accident after the accident to before the road rescuer arrives or leaves, so that the rescuer can consider the road congestion and arrive at the scene as soon as possible, so as to improve the rescue efficiency.

The embodiment of the present disclosure also provides a computer-readable storage medium, the storage medium storing computer instruction, when a computer reads a computer instruction in the storage medium, the computer operates the aforementioned method of accident rescue in a smart city based on the Internet of Things.

The basic concepts have been described above, apparently, in detail, as will be described above, and do not constitute a limitation of the present disclosure. Although there is no clear explanation here, those skilled in the art may make various modifications, improvements, and corrections for the present disclosure. This type of modification, improvement, and corrections are recommended in the present disclosure, so this class is corrected, improved, and the amendment remains in the spirit and scope of the exemplary embodiment of the present disclosure.

Meanwhile, the present disclosure uses specific words to describe embodiments of the present specification. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, certain features, structures, or features of one or more embodiments of the present disclosure may be combined.

Moreover, unless otherwise specified in the claims, the sequence of the present disclosure, the order of the sequence of the present disclosure, the use of digital letters, or other names are not used to define the order of the present disclosure processes and methods. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software-only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the features needed in the spectrum ratio of this disclosure ratio are more characteristic. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate a ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present disclosure are used to confirm its range breadth, in the specific embodiment, the settings of such values are as accurate as possible within the feasible range.

For each patent, patent application, patent application publications and other materials referenced in this specification, such as articles, books, instructions, publications, documents, etc., here, all of them will be incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflict with the content described in the present disclosure, the use of description, definition, and/or terms in this manual shall prevail.

Finally, it should be understood that the embodiments described in the present disclosure are intended to illustrate the principles of the embodiments of the present disclosure. Other deformations may also belong to the scope of this disclosure. Thus, as an example, not limited, the alternative configuration of the present disclosure embodiment can be consistent with the teachings of the present disclosure. Accordingly, the embodiments of the present disclosure are not limited to the embodiments of the present disclosure clearly introduced and described.

We claim:

1. A method for accident rescue in a smart city based on the Internet of Things, wherein the Internet of Things includes a rescue management platform, a sensor network platform, and an object monitoring platform, and the method is implemented by the rescue management platform, the method comprising:

- accessing the object monitoring platform by the sensor network platform and obtaining monitoring information of a target area photographed by a monitoring device located in the target area from the object monitoring platform;
- judging whether an abnormal accident occurs in the target area based on the monitoring information;
- determining an accident type of the abnormal accident when the abnormal accident occurs in the target area;
- generating rescue reminder information based on the accident type, wherein the rescue reminder information includes a rescue mode of the abnormal accident; and
- sending the rescue reminder information to a rescuer;
- wherein the method further comprises:
- obtaining road monitoring information of each road in a preset road network area corresponding to the target area within a preset time period;
- determining a degree of road congestion of the each road caused by the abnormal accident in a target time period through a prediction model based on the road monitoring information, the prediction model being a machine learning model; wherein the prediction model is obtained by a training process including:
  - obtaining a plurality of training samples with labels, wherein the training samples include historical intersection features of intersections and historical first road features of roads between the intersections represented by a graph in the sense of graph theory in a historical period, the labels of the training samples are a historical degree of road congestion of each road in the graph;
  - inputting the plurality of training samples with labels into an initial prediction model;
  - constructing a loss function based on the labels and output results of the initial prediction model;
  - updating parameters of the initial prediction model based on the loss function; and
  - obtaining the prediction model until the loss function meeting a preset condition;
- determining a degree of area congestion of the preset road network area caused by the abnormal accident in the target time period based on the degree of road congestion; and
- starting traffic emergency treatment when the degree of area congestion is greater than a preset degree threshold.

2. The method of claim 1, wherein the determining the degree of road congestion of the each road caused by the abnormal accident in the target time period through a prediction model based on the road monitoring information comprises:

determining a count of vehicles and/or traffic flow of the each road in the preset road network area within the preset time period based on the road monitoring information; and determining the degree of road congestion of the each road caused by the abnormal accident in the target time period through the prediction model based on the count of vehicles and the traffic flow of the each road in the preset road network area within the preset time period.

3. The method of claim 2, wherein the determining the count of vehicles of the each road in the preset road network area within the preset time period based on the road monitoring information comprises:

processing the road monitoring information based on a first determination model, and determining the count of vehicles of the each road in the preset road network area within the preset time period, wherein the first determination model is a machine learning model.

4. The method of claim 2, wherein the determining the traffic flow of the each road in the preset road network area within the preset time period based on the road monitoring information comprises:

processing the road monitoring information based on a second determination model, and determining the traffic flow of the each road in the preset road network area within the preset time period, wherein the second determination model is a machine learning model.

5. The method of claim 1, further comprising:

obtaining first location information of the rescuer and second location information of the target area;

generating route planning information for the rescuer to reach the target area based on the first location information, the second location information and the degree of road congestion;

sending the route planning information to the rescuer; and navigating the rescuer based on the route planning information.

* * * * *